United States Patent [19]

Okada et al.

[11] Patent Number: 4,734,765

[45] Date of Patent: Mar. 29, 1988

[54] VIDEO/AUDIO INFORMATION TRANSMISSION SYSTEM

[75] Inventors: Shigetoshi Okada, Kanazawa; Shoichi Matsuhashi, Tokyo; Yoji Shibata; Wataru Kosuge, both of Yokohama, all of Japan

[73] Assignees: Nippon Telegraph & Telephone Public Corp.; Hitachi, Ltd., both of Tokyo, Japan

[21] Appl. No.: 965,704

[22] Filed: Dec. 1, 1978

[30] Foreign Application Priority Data

Dec. 2, 1977 [JP] Japan .................................. 52-143969

[51] Int. Cl.$^4$ ............................................. H04N 7/18
[52] U.S. Cl. ..................................... 358/102; 340/706;
358/903; 379/53
[58] Field of Search .......................... 358/93, 102, 903;
364/200, 900; 340/706, 717, 721, 745, 152 R

[56] References Cited

U.S. PATENT DOCUMENTS

3,500,327  3/1970  Belcher et al. ...................... 340/154
3,654,708  4/1972  Brudner ............................... 358/903
3,813,485  5/1974  Arps ..................................... 358/903
3,854,004  12/1974 Baumel et al. ....................... 358/102
4,028,733  6/1977  Ulicki ................................... 358/102
4,041,463  8/1977  Slutzky et al. ....................... 364/900
4,115,765  9/1978  Hartke ................................. 340/706

Primary Examiner—Joseph A. Orsino, Jr.
Attorney, Agent, or Firm—Antonelli, Terry & Wands

[57] ABSTRACT

A center-to-end type information service system utilizing the public telephone networks that are fundamental communication media of nation-wide scale is disclosed in which desired information is requested from the terminal side to the center by means of a telephone set or simplified keyboard and then delivered to and received by a TV receiver. A part of the center functions is transferred together with the exchange function to a subcenter located near the terminal. Thus, the length of transmission path connecting the center to terminals becomes shorter and the cost of the whole system can be cut down. A simplified character generator is provided in the subcenter, thereby diminishing traffic of the video network.

9 Claims, 8 Drawing Figures

VIDEO/AUDIO INFORMATION TRANSMISSION SYSTEM

In correspondence with the increasing requirement for variety and property of information, multiple information service systems have been developed in many countries which can provide various information such as picture image or data through a wideband large-capacity communication network. For such systems, there has been considered the multipurpose utilization of fundamental media such as broadcasting waves or telephone network. As regards the utilization of broadcasting waves, in addition to the experimental character multiplexed broadcasting in Great Britain called "TELETEXT", development tests are now effected in many countries on audio multiplexed broadcasting and on character multiplexed broadcasting. On the other hand, as regards the utilization of telephone network, development tests called "PRESS-TEL" have been exercised by the British Post Office and have gained public favor.

The present invention relates to multiple information service systems in which the telephone communication and the TV broadcasting, each being one of fundamental media of nation-wide scale, are combined into one and which can provide various information such as picture image or data.

As the approach to multipurpose utilization of broadcasting, telephone and the like, there are be considered the following manners: (1) effective utilization of the existing communication networks, (2) development of regional small-scale systems for the public, and (3) prevalence of individual private systems. As examples effectively utilizing the existing communication networks, there are known such systems in Great Britain as called CEEFAX or PRESS-TEL (VIEWDATA), which employ effectively the existing communication media such as broadcasting waves or telephone network. As the regional small-scale systems for the public, PYRAMID system of Ampex Corp. and "Interactive Cable Vision" of Mitre Corp. have been tested in U.S.A.

However, the above-mentioned PRESS-TEL system in Great Britain is such that the information requested through a telephone circuit from a terminal is data-transmitted to the terminal again through the telephone circuit to display a desired picture image on a terminal color TV receiver or a special display device having display and telephone functions. In this system, character codes and picture element indicating codes which employ a part of the character codes are transmitted from the center to a terminal to form and display one picture image by means of a character generator provided in the terminal. Therefore, this system has drawbacks that it is impossible to transmit any stationary picture and that the terminal inevitably becomes expensive. Incidentally, the ANTIOPE system, which has been put into practical use in France, is the same kind as the above-mentioned PRESS-TEL system.

Further, in the PYRAMID system developed by Ampex Corp. for a video/audio information searching system in school, respective information from a video information source such as a TV camera provided in the center and from an audio information source such as a microphone is once stored in video and audio masters. In response to a request from a terminal, video and audio signals for one frame, which are randomly picked up from the above masters, are first transferred to video and audio buffer memories and then transmitted to the terminal. However, because of a lack of exchange function on the center side, this system has drawbacks that it is wanting in expansibility, that its utilization is limited to a narrow region and that the center is high in its cost when viewed from the terminal.

Further, one of two kinds of TICCIT system developed by MITRE Corp. is for a very narrow region such as school and the other is for a small area covering about 2000 terminals. Each system operates as follows. In response to a request from a terminal, digital character signals are outputted from a character generator controlled by a computer, and the signals for one frame are once stored in a refresh memory. The stored signals are transformed into video on picture signals through the repeating regeneration and are transmitted, after the modulation by a modulator, to a plurality of terminals through a single coaxial cable. However, it is impossible for the system to produce analog half-tone since the digital character signals are formed and used. Further, the system is great in division loss and is wanting in expansibility and in effect due to large grouping, since it has no exchange function. Although, in view of the above-mentioned, a hub system is used, the cost of the center side viewed from terminals is as high as in the PYRAMID system. Further, the system is small in expansibility as compared with systems utilizing the existing public circuit, since the video or picture information and the audio information are tansmitted through respective transmission lines.

Now, the present invention as well as the prior art system will be explained referring to the accompanying drawings, in which:

DESCRIPTION OF THE PREFERRED EMBODIMENTS

Figure 1:
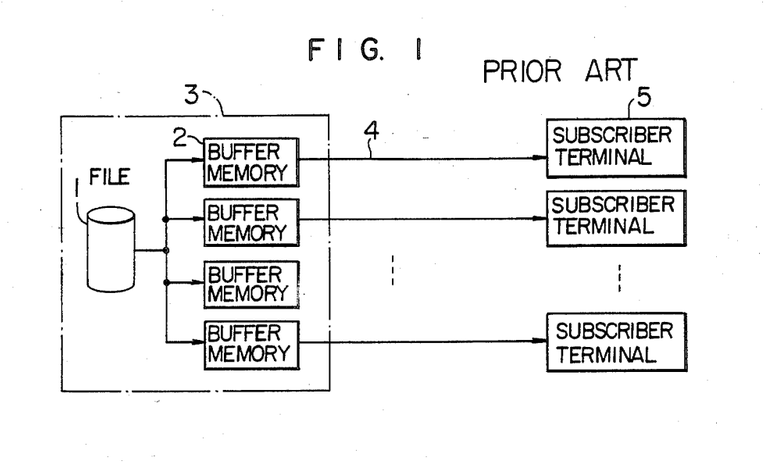
FIG. 1 is a block diagram showing a conventional video or picture/audio transmission system.

The essential features of the above-mentioned prior art techniques can be shown by FIG. 1. In the figure, a center 3 includes therein a video or picture/audio file 1 and video or picture/audio buffer memories 2, and is connected with subscriber terminals 5 through subscriber transmission paths 4. The data transmission from the picture/audio file 1 to the picture/audio buffer memories 2 is performed in a short time. For example, in the picture system, a picture image for one frame is transmitted from the picture file to the picture buffer memories and stationary pictures are continuously outputted from the picture buffer memories. In the audio system, on the other hand, time axis compressed high-speed audio information is transmitted from the audio file to the audio buffer memories and is then sujected to the velocity transformation in the audio buffer memories to deliver audio signals at low speed. Since the center 3 is connected to the subscriber terminals 5 by the subscriber transmission paths 4, the system of the above kind has a drawback that subscriber transmission paths become expensive when the distance between the center 3 and each of the subscriber terminals 5 is elongated.

An object of the present invention is to eliminate the above drawbacks of prior art techniques and to reduce the total cost of the system.

A further object of the present invention is to reduce the length of each of a longer number of subscriber transmission paths by transferring picture/audio buffer memories and a part of character generator included in the center into and providing a change-over switch within a subcenter located near a subscriber, thereby cutting down the total cost of the system.

A still further object of the present invention is to diminish traffic of output video signal from a center by providing a character generator for input monitor information within a subcenter located near a subscriber terminal.

According to the present invention, there is provided a picture/audio information transmission system comprising a center including therein a picture and audio file, a character generator for generating character information, change-over switch means for changing over information from said picture and audio file and information from said character generator, a subcenter located between said center and a subscriber terminal and including picture and audio buffer memory means, transmission path means for connecting said center and said subcenter, and subscriber transmission path means for said subcenter and said subscriber terminal, the picture and audio information or the character information being transmitted to said subscriber terminal, wherein a part of said character generator and said change-over switch means are provided within said subcenter so that traffic of output picture information of said center is diminished.

Figure 2:
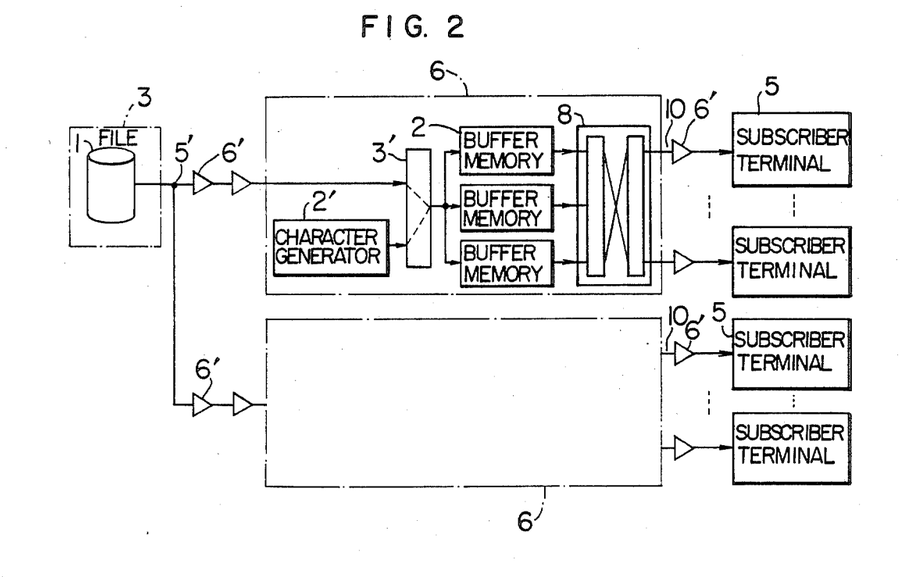
FIG. 2 is a block diagram showing a buffer memory distributing type picture/audio exchanging transmission network according to an embodiment of the present invention.

The present invention will be explained using an embodiment shown in FIG. 2. Referring to FIG. 2, a center 3 includes a picture/audio file 1. Subcenters 6 are connected to the center 4 through transmission lines 5' and repeaters 6'. In each subcenter 6, reference numeral 2' indicates a character generator for generating input monitor information (character information displayed on a screen upon depression of a key by a subscriber and being identical to the depressed key), numeral 3' a change-over switch, numerals 2 picture/audio buffer memories and numeral 8 an exchanger. Information transmitted through the exchanger 8 is transmitted to a subscriber terminal 5 through transmission lines 10 and repeaters 6'.

Since the simplified character generator 2' and the change-over switch 3' are thus provided within the subcenter 6 as shown in FIG. 2, information outputted from the center 3 is usual picture and audio information other than the input monitor information.

Figure 3A:
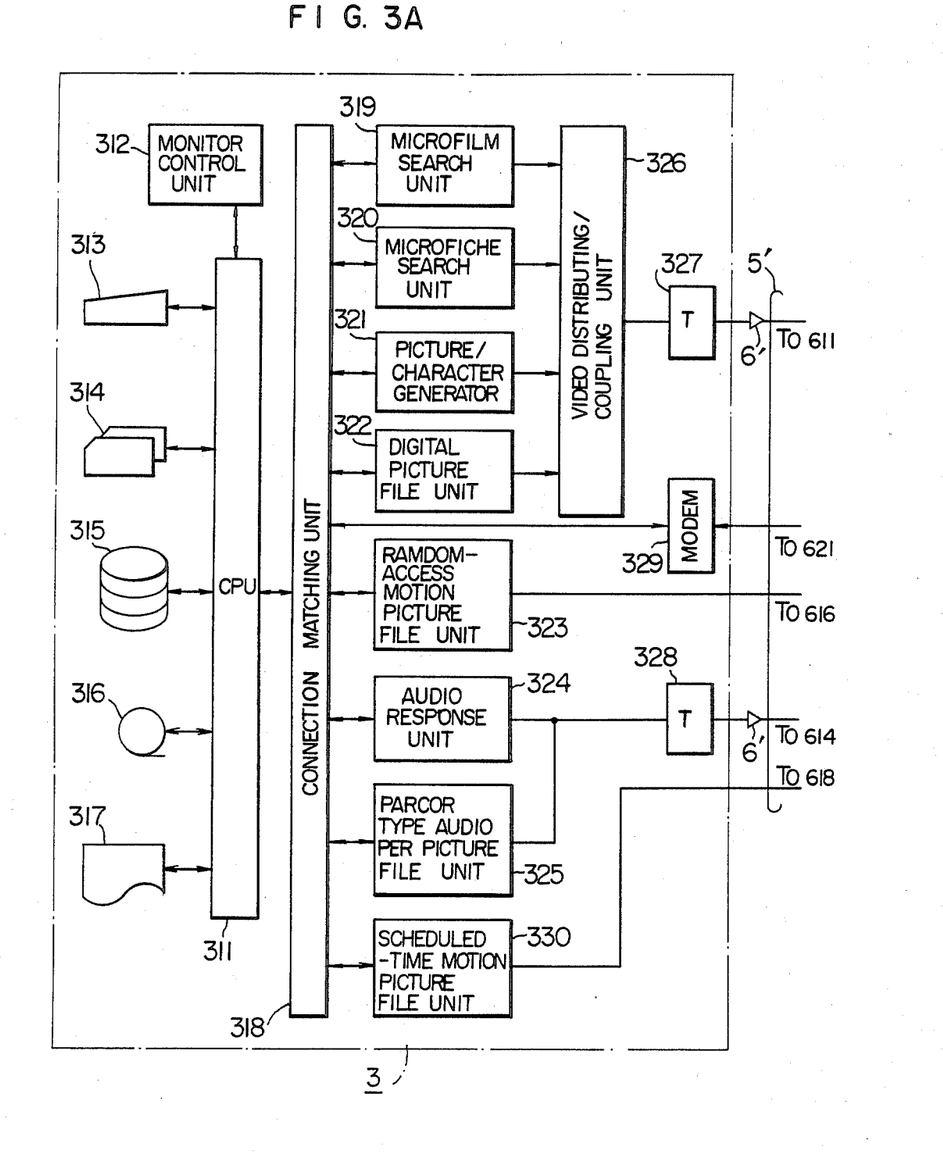
FIGS. 3A and 3B are detailed block diagrams for explaining each block shown in FIG. 2 in more detail.
Figure 3B:
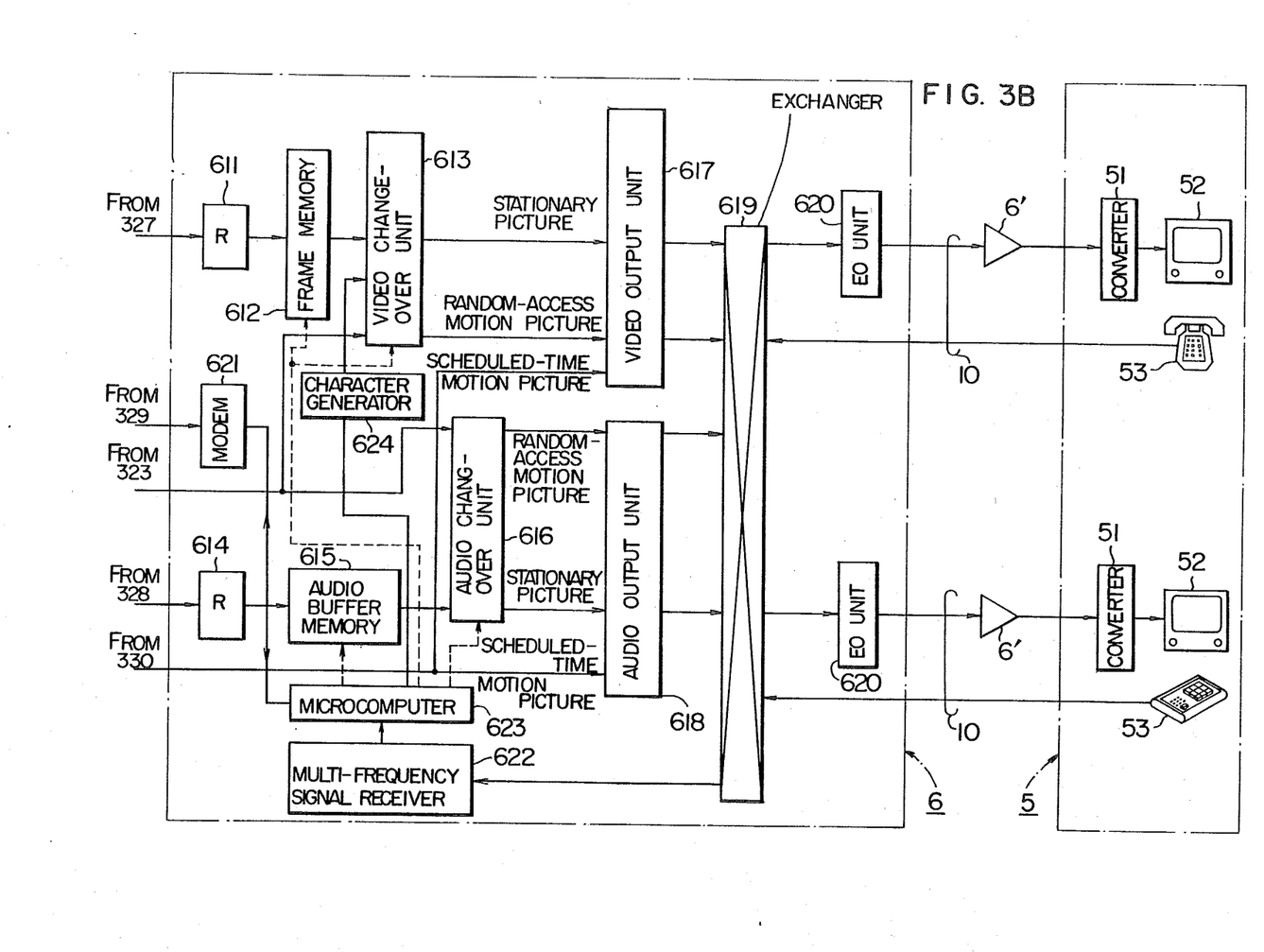

FIGS. 3A and 3B are block diagrams showing a detailed construction of each block in FIG. 2 mainly showing the video signal system and excepting the audio signal system. Referring to FIG. 3A, a center 3 includes CPU (Center Processing Unit) 311, monitor control unit 312, data typewriter 313, card reader 314, magnetic disk pack unit 315, magnetic tape unit 316, line printer 317, connection matching unit 318, microfilm search unit 319, microfiche search unit 320, picture/character generator 321, digital picture file unit 322, random-access motion picture file 323, audio response unit 324, PARCOR type audio per picture file unit 325, video distributing/coupling unit 326, video signal transmitter 327, audio signal transmitter 328, control signal transmitter (MODEM) 329 and scheduled-time motion picture file unit 330. The center 3, in which picture/audio units such as picture and audio files of various kinds are controlled by the CPU 311, has a function of sending to the subcenter 6 the information requested from the subscriber terminal 5.

Reffering to FIG. 3B, the subcenter 6 includes video signal receiver 611, frame memory 612, video change-over unit 613, audio signal receiver 614, audio buffer memory 615, audio change-over unit 616, video output unit 617, audio output unit 618, exchanger 619, end office (EO) units 620, control signal receiver (MODEM) 621, multifrequency signal receiver 622, microcomputer 623 and a simplified character generator 624. The subcenter 6 has a function of storing video signals sent out of the center 3, sending video signals out of the frame memory 612 at a rate of 30 pictures per second and sending audio signal out of the audio buffer memory 615. The video and audio signals are respectively sent out at color baseband of 4 MHz to the subscriber terminal 5 through the exchanger 619 and the end office units 620.

Figure 4:
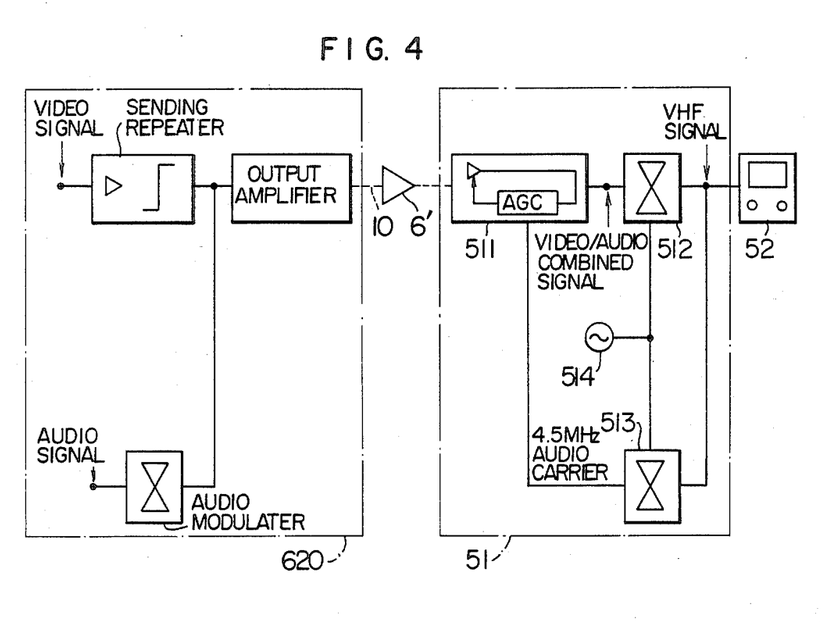
FIG. 4 is a block diagram showing a part ranging from a video or subcenter to a terminal of a picture/audio transmission system.

The transmission line 10 has a function of simultaneously sending, by means of a single transmission path, video and audio signals in which video signals at baseband and audio signals frequency-modulated to a band of 4.5 MHz outside the transmission band of video signals are superimposed as shown in FIG. 4, and of connecting them through a wideband intermediate repeater or amplifier with a converter of the subscriber terminal 5.

As shown in FIG. 3B, the subscriber terminal 5 includes converter 51, TV receiver 52 and terminal controller 53 such as pushphone or simplified keyboard. As shown in FIG. 4, the converter 51 includes terminal repeater or amplifier 511, modulators 512, 513 and oscillator 514. The subscriber terminal 5 has a function of inputting video signals, which are subjected to equalization, amplification and frequency conversion to VHF, to a vacant channel or video input terminal of the general TV receiver 52.

Figure 5:
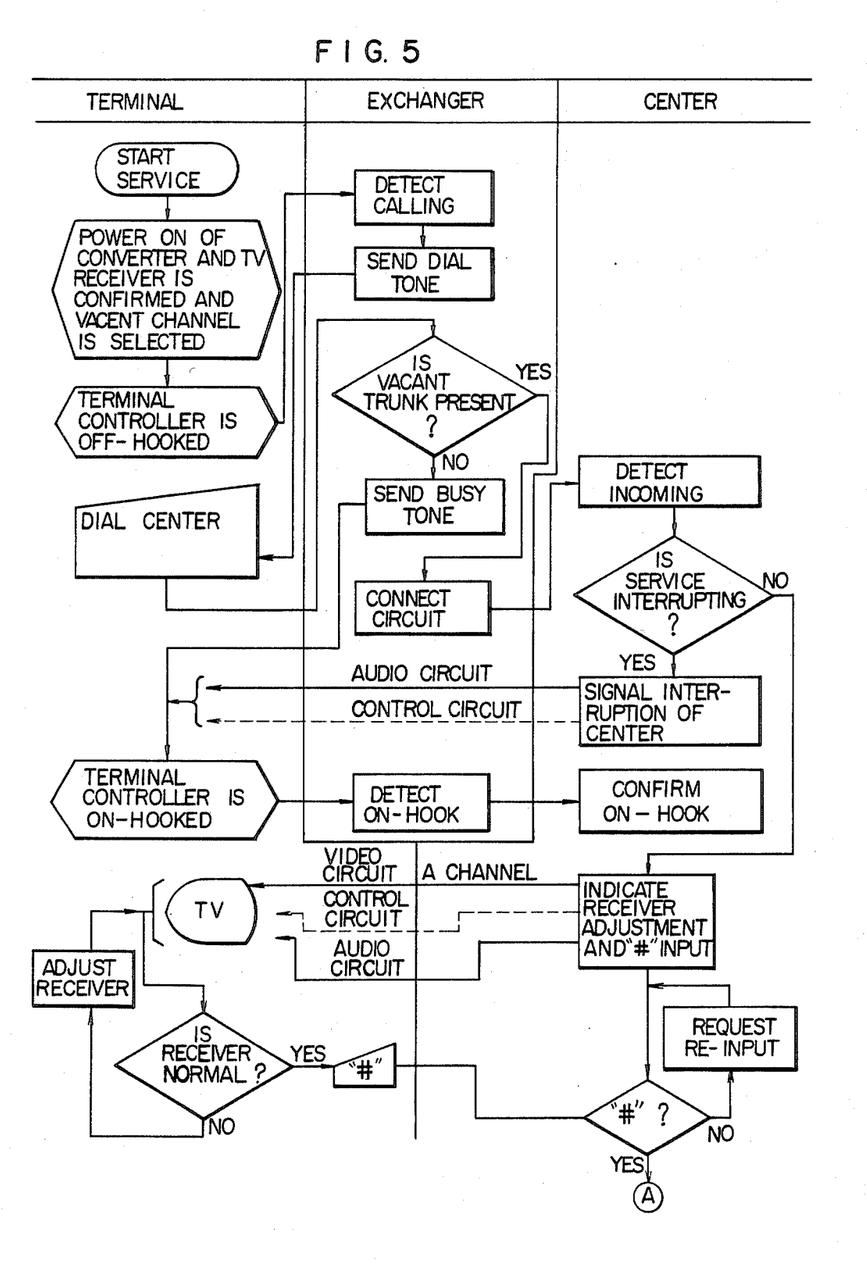
FIG. 5 is a flow chart explaining the procedure for starting the desired service.

Subsequently, the procedure for starting the required service will be explained in accordance with the flow chart shown in FIG. 5. In the case when picture/audio information is first requested through the subcenter 6 to the center 3, turn-on of each of power sources for the converter 51 and the TV receiver 52 is confirmed and a vacant channel (for example, channel No. 2) of the TV receiver is selected. When the terminal controller 53 such as pushphone or simplified keyboard is made off-hook, the exchanger 619 of the subcenter 6 detects calling of the subscriber terminal 5 and sends out a dial tone to the calling subscriber terminal. When the calling subscriber terminal receives the dial tone, dialing is performed to attain a circuit connection between the subscriber terminal 5 and the subcenter 6. When there is found no vacant trunk in the exchanger 619 of the subcenter 6, a busy tone is sent out of the exchanger 619 to the calling subscriber terminal 5 to be made on-hook at the calling subscriber terminal as done in a telphone set.

On the other hand, when there is found a vacant trunk, the circuit connection is made.

In the subcenter 6, together with the detection of incoming, the following different operations are performed according to whether service is now going on or interrupting. That is, when service is interrupting, a subcenter out-of-operation notice is sent to the calling subscriber terminal. The like notice is also sent out for the out-of-operation of the center 3. When service is going on, both a test pattern and a signal indicating to adjust the TV receiver are sent to the calling subscriber terminal.

In the calling subscriber terminal 5, when the receiving condition of the TV receiver 52 is good or normal, the call signal (for example, #) showing the good condition of TV receiver is sent out. When the receiving condition is not good, on the other hand, the TV receiver 52 is adjusted to obtain the good condition and then the call informing the good condition of TV receiver 52 is made.

Next, in the calling subscriber terminal 5, there is inputted by means of the terminal controller 53 a service menu number (number for service connection) which is selected from a service menu prepared in the center. Then, the simplified character generator 624 generates character information corresponding to the number inputted from the terminal controller 53 to display the character on the TV receiver 52 of the calling subscriber terminal 5. The service menu number is sent to the center 3 through the multi-frequency signal receiver 622, microcomputer 623, control signal receiver (MODEM) 621 and control signal transmitter (MODEM) 329 in the subcenter 6 and is processed by the CPU 311. The desired video information corresponds to the contents of request is sent, directly or through the video distributing/coupling unit 326 and the video signal transmitter 327, from one or more of the microfilm search unit 319, microfiche search unit 320, picture/character generator 321, digital picture file unit 322, random-access motion picture file unit 323 and scheduled-time motion picture file unit 330. On the other hand, the desired audio information is sent through the audio signal transmitter 328 from either one or both of the audio response unit 324 and the PARCOR type audio per picture file unit 325. Further, control signals for the frame memory 612, video change-over unit 613, audio buffer memory 615 and audio changeover unit 616 in the subcenter 6 are separately sent out through the CPU 311, connection matching unit 318 and control signal transmitter 329. The video and audio signals corresponding to the request from the subscriber terminal 5 and the control signals are transmitted through three circuit lines to the subcenter 6 in a time-divisional fashion and at high speed.

Figure 6A:
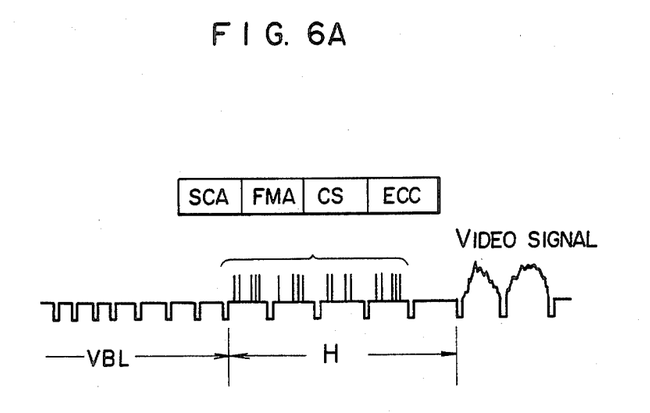
FIGS. 6A and 6B are views for explaining examples of information transmission between the center and the subcenter.

For example, as shown in FIG. 6A, the transmission of video or picture information is carried out by superimposing subcenter address SCA, frame memory address FMA, control signal CS for control of the interruption and activation of frame memory, and error correcting code ECC, in a binary signal form, during serveral horizontal scanning periods H follows just after the vertical blanking signal VBL. The transmission of audio information is carried out in a usual audio multiplexed transmission form accompanying subcenter address and audio buffer memory address, like the transmission of picture information.

The video and audio signals are respectively received at the video signal receiver 611 and at the audio signal receiver 614, and applied to the frame memory 612 and the audio buffer memory 615 respectively. On the other hand, the control signals are received by the control signal receiver (MODEM) 621 and the microcomputer 623 to be applied to the frame memory 612, video change-over unit 613, audio buffer memory 615 and audio change-over unit 616, as mentioned previously. As regards video information, a stationary picture taken out of the frame memory 612 and a random-access motion picture directly sent to the video change-over unit 613 are changed over by the video changeover unit 613 and then delivered to the end office unit 620 through the video output unit 617 and the exchanger 619. As regards audio information, the audio information from the audio buffer memory 615 and the audio information for the random-access motion picture are changed over by the audio change-over unit 616 and then delivered to the end office unit 620 through the audio output unit 618 and the exchanger 619.

Figure 6B:
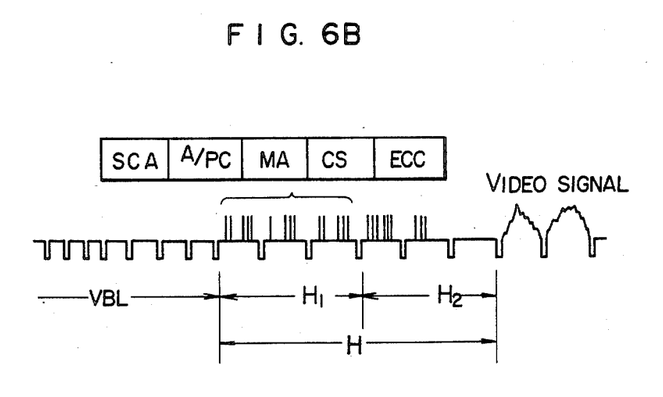

In the case where a single transmission pack is used between the center 3 and the subcenter 6, the transmission may be carried out as shown in FIG. 6B. Namely, subcenter address SCA, audio/picture indicating bit A/P, frame/audio buffer memory address MA, control signal CS for control of the interruption and activation of frame/audio buffer memory, and error correcting code ECC is superimposed in a binary signal form during the former portion $H_1$ of several horizontal scanning periods H followed just after the vertical blanking signal VBL, and audio signal compressed (for example, to 1/1000) with respect to time axis is superimposed in a binary or quarternary PCM signal form during the latter portion $H_2$ of the horizontal scanning periods H.

In the end office unit 620, as is shown in FIG. 4, the video information signal and the audio modulated wave formed by modulating the audio information signal with a modulating signal of 4.5 MHz are mixed and then sent into the transmission path 10 (for example, a baseband transmission path employing a balanced, period cable).

In the subscriber terminal 5, the video/audio information is received by the converter 51, subjected to equalization and amplification of video signal in the terminal amplifier 511, converted to NTSC color TV signal of VHF band by means of the modulators 512, 513 and the oscillator 514, and inputted to a vacant channel of the general TV receiver 52 to be reproduced.

Subsequently, service of video information or the like can be given through the subcenter 6 from the center 3 to the subscriber terminal 5 by effecting in the terminal control unit 53 such six requests as proceeding to next picture information, resending, backspace for going back to the preceding picture information, return for going back to the position of picture information at the time when the backspace starts, erasure for erasing input data, and interruption for requesting another service by interrupting the present service. The subscriber terminal 5 is made on-hook when sevice terminals.

As described above, when in the calling subscriber terminal 5 a service menu number (number for service connection) for requesting the service of desired information to the center is inputted from the terminal controller 53, the simplified character generator 624 has a function of generating a character signal for superimposing the service menu number on a picture image being now in service. When the calling subscriber confirms the inputted information and inputs confirmation information (for example, puts "#" key), the superimposed service menu number is erased from the screen on the terminal controller 53 and the number is sent to the center 3. By providing such a function to the subcenter 6, traffics of the upward circuit for data (control circuit) and the upward and downward circuits for stationary picture between the center 4 and the subcenter 6 can be diminished.

What is claimed is:

1. A video/audio information service system comprising:

a center including therein files in which video/audio information are recorded, the center being disposed at a first location;

a plurality of subcenters disposed at different second locations spaced from said first location between said center and a plurality of subscriber terminals, respective subscriber terminals being disposed at different third locations and associated with respective ones of said subcenters, the distance between said subscriber terminals and said center being greater than the distance between said subscriber terminals and associated subcenter, each of said subcenters including therein a character generator means for generating character information for an input monitor means corresponding to character information inputted from said subscriber terminals, change-over switch means for changing over said video/audio information and said character information, said change-over switch means being coupled to said character generator means, a plurality of video/audio buffer memories coupled to said change-over switch means, exchange means coupled to said video/audio buffer memories for communicating with said associated subscriber terminals, video system means having a frame memory, a video change-over unit coupled to said frame memory, a video output unit coupled to said video change-over unit and said character generator means coupled to said video change-over unit, audio system means having an audio change-over unit, said audio buffer memory coupled to said audio change-over unit and an audio output unit coupled to said audio change-over unit, control system means having a multi-frequency receiver and a microcomputer coupled to said multi-frequency receiver, said audio buffer memory and said character generator means, and said exchange means having an exchanger coupled to said audio and video output units and end office units coupled to said exchanger, first transmission path means for connecting said center and said subcenters respectively to transmit said video/audio information in an analog baseband signal form, said character generator means in each subcenter being provided for diminishing traffic of said first transmission path means between said center and subcenters; and second transmission path means for connecting said subcenter and said subscriber terminals respectively to transmit said video/audio information and said character information in an analog baseband signal form.

2. A video/audio information service system according to claim 1, wherein the files in which video/audio information are recorded has a video information file and an audio information file, the audio information file includes a microfilm search unit, a microfiche search unit, a picture/character generator, a digital picture file unit, a random-access motion picture file unit and a scheduled-time motion picture file unit, and wherein the audio information file includes an audio response unit and a PARCOR type audio per picture file unit.

3. A video/audio information service system according to claim 1, wherein said second transmission path means directly connects said subcenter and said subscriber terminals.

4. A video/audio information service system according to claim 1, wherein said first and second transmission path means include public telephone networks.

5. A video/audio information service system according to claim 1, wherein said character generator means generates character information for display on said input monitor means at said subscriber terminal in response to input information from said subscriber terminal for service connection, said first and second transmission path means including repeater means therein.

6. A video/audio information service system according to claim 1, wherein said subscriber terminal includes said input monitor means, said inut monitor means including a TV receiver, a converter coupled to said TV receiver for converting into an NTSC color TV signal, said signal transmitted in the analog baseband signal form, and terminal control means coupled to said associated subcenter.

7. A video/audio information service system according to claim 6, wherein said terminal controller means includes a push-phone.

8. A video/audio information service system according to claim 6, wherein said terminal controller means includes a keyboard.

9. A video/audio information service system comprising:

a center including a plurality of video and audio files, and a central processing unit for controlling the files;

a plurality of subscriber units, each subscriber unit including TV receiver means, converter means for converting an analog baseband signal into a standard TV signal for application to said receiver means, and terminal controller means for generating a calling signal and a request;

a plurality of subcenters each accommodating thereto a plurality of said subscriber units, each of said subcenters including therein a character generator means for generating character information for said TV receiver means corresponding to character information inputted from said subscriber units, change-over switch means for changing over said video/audio information and said character information, said change-over switch means being coupled to said character generator means, a plurality of video/audio buffer memories coupled to said change-over switch means, said exchange means coupled to said video/audio buffer memories for communicating with said associated subscriber units;

first transmission path means for connecting said center and said subcenter respectively to transmit said video/audio information in an analog based band signal form, said character generator means in each subcenter being provided for diminishing traffic of said first transmission path means between said center and subcenters; and second transmission path means for connecting said subcenter and said subscriber units respectively to transmit said video/audio information and said character information in an analog baseband signal form, said central processing unit controlling said video and audio files in accordance with requests from said subscriber units via said subcenters, and wherein said subcenter includes picture system means having a frame memory, a video change-over unit coupled to said frame memory, a video output unit coupled to said video change-over unit and said character generator means coupled to said video change-over unit, audio system means having an audio change-over unit, said audio buffer memory coupled to said audio change-over unit and an audio output unit coupled to said audio change-over unit, control system means having a multi-frequency receiver and a microcomputer coupled to said multi-frequency receiver, said audio buffer memory and said character generator means, and said exchange means having an exchanger coupled to said audio and video output units and end office units coupled to said exchanger.

* * * * *